United States Patent
Güthner et al.

(10) Patent No.: US 11,559,056 B2
(45) Date of Patent: Jan. 24, 2023

(54) STORAGE-STABLE SOLUTIONS CONTAINING CYANAMIDE

(71) Applicant: AlzChem Trostberg GmbH, Trostberg (DE)

(72) Inventors: Thomas Güthner, Trostberg (DE); Jürgen Sans, Trostberg (DE); Jürgen Bezler, Burghausen (DE); Martin Eberl, Niederbergkirchen (DE); José Martinez, Traunstein (DE)

(73) Assignee: Alzchem Trostberg GmbH, Trostberg (DE)

( * ) Notice: Subject to any disclaimer, the term of this patent is extended or adjusted under 35 U.S.C. 154(b) by 341 days.

(21) Appl. No.: 16/496,001

(22) PCT Filed: Apr. 11, 2018

(86) PCT No.: PCT/EP2018/059257
§ 371 (c)(1),
(2) Date: Sep. 20, 2019

(87) PCT Pub. No.: WO2018/189227
PCT Pub. Date: Oct. 18, 2018

(65) Prior Publication Data
US 2020/0100498 A1    Apr. 2, 2020

(30) Foreign Application Priority Data

Apr. 15, 2017 (DE) ..................... 10 2017 003 691.8

(51) Int. Cl.
*A01N 25/02* (2006.01)
*A01N 25/30* (2006.01)
*A01N 37/34* (2006.01)
*C05C 7/00* (2006.01)

(52) U.S. Cl.
CPC ............. *A01N 37/34* (2013.01); *A01N 25/02* (2013.01); *A01N 25/30* (2013.01); *C05C 7/00* (2013.01)

(58) Field of Classification Search
None
See application file for complete search history.

(56) References Cited

U.S. PATENT DOCUMENTS

| | | |
|---|---|---|
| 4,126,664 A | 11/1978 | Weiss |
| 4,477,421 A | 10/1984 | Weiss |
| 4,562,289 A | 12/1985 | Hajek et al. |
| 6,054,411 A | 4/2000 | Horikiri et al. |
| 2011/0009438 A1* | 1/2011 | Mita ............... A61P 33/14 514/274 |
| 2013/0050194 A1 | 2/2013 | Makino et al. |
| 2017/0064944 A1 | 3/2017 | Güthner |

FOREIGN PATENT DOCUMENTS

| | | | |
|---|---|---|---|
| DE | 102014003082 A1 | | 9/2015 |
| EP | 0095065 A1 | | 11/1983 |
| JP | 2000204007 A | * | 7/2000 |
| JP | 2000204007 A | * | 7/2000 |
| JP | 2000204007 A | | 1/2002 |
| WO | WO-9422311 A1 | * | 10/1994 ............. A01N 25/30 |

OTHER PUBLICATIONS

German Application No. 10 2017 003 691.8, German Search Report dated Nov. 28, 2017, 7 pages.
International Application No. PCT/EP2018/059257, International Search Report dated Jun. 5, 2018, 9 pages.

* cited by examiner

*Primary Examiner* — Alton N Pryor
(74) *Attorney, Agent, or Firm* — Kilpatrick Townsend & Stockton LLP

(57) ABSTRACT

The invention relates to aqueous solutions containing cyanamide, particularly storage-stable aqueous solutions containing cyanamide which contain a stabilizer and a surfactant.

13 Claims, No Drawings

STORAGE-STABLE SOLUTIONS CONTAINING CYANAMIDE

The invention relates to aqueous solutions containing cyanamide, in particular storage-stable aqueous solutions containing cyanamide, which contain a stabilizer and a surfactant.

Aqueous cyanamide solutions have a variety of uses. As a raw material for chemical syntheses they serve for the production of guanidines, thioureas, iso-urea derivatives, N-cyanimides and heterocyclic links such as pyrimidines, 1,3,5-triazines, imidazoles, 1,2,4-triazoles and tetrazoles. In the agricultural sector, aqueous cyanamide solutions are used as a biocide, as a growth regulator or as a dormancy-breaking phytohormone. In detergents and cleaning agents as well as in pulp bleaching, aqueous cyanamide solutions are used as a bleach activator for peroxides.

Commercially available cyanamide solutions are today available in large quantities in the form of an aqueous solution, usually in the concentration range around 50% by weight.

In addition, cyanamide is marketed as a solid with a content of about 99%.

Aqueous cyanamide solutions have a limited storage stability, since, depending on their pH and concentration, both dimerization to dicyandiamide (N-cyanoguanidine) and hydration to urea and further to ammonium carbamate or ammonium carbonate occurs. In order to delay this unwanted reactions, various stabilizers have already been proposed. For example, alkoxyethyl acetates (see U.S. Pat. No. 3,295,926), boric acid (see SU 122742), carboxylic esters such as ethyl formate (see DE 2642023) or diammonium phosphate (see JP 10203824) have been proposed as stabilizers. In the technical field a stabilizer system based on inorganic phosphates has proven successful (see Kirk-Othmer, Encyclopedia of Chemical Technology, 3rd edition 1979, Vol. 7, page 297).

In case of particularly high stability requirements, it is additionally possible to use a system comprising inorganic or organic magnesium salts, in particular magnesium chloride hexahydrate (see DE 3219054).

Unfortunately, the known stabilization systems do not provide a sufficient stability for some applications—in particular when longer storage periods in warm countries are required. The object of the invention is therefore to find a further improved stabilization system for aqueous cyanamide solutions. In addition, an object of the present invention is to provide a storage-stable solution containing cyanamide, which can be used in a variety of applications, in particular in agriculture for the regulation of plant growth, the application of which can be considered harmless for the user.

According to the invention these objects are achieved by a composition according to claim 1. Accordingly, the subject of the present invention is a solution containing cyanamide, which comprises:
a) 15 to 60% by weight cyanamide,
b) 0.01 to 4% by weight of a stabilizer containing one or more compounds from the group of phosphorus-containing acids or the salts thereof,
c) 0.01 to 4% by weight of a nonionic surfactant containing one or more compounds from the group of ethoxylates according to formula (I), fatty alcohol glucosides according to formula (II) or mixtures thereof, wherein for formula (I) and (II) the following applies,

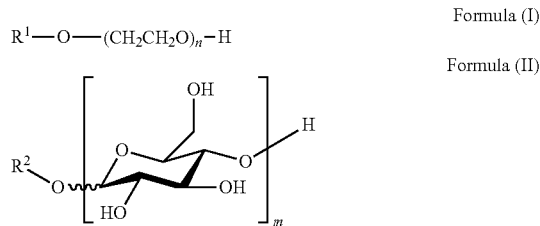

Formula (I)

Formula (II)

wherein for the radicals $R^1$, $R^2$ and the indices n, m the following applies, together or independently:
  $R^1$=a linear or branched alkyl or alkenyl group having 6 to 24 carbon atoms, a partially or fully fluorinated alkyl group having 6 to 18 carbon atoms, a phenyl group, an alkyl-substituted phenyl group, a mono- or polyfunctional siloxane group,
  $R^2$=a linear or branched alkyl or alkenyl group having 6 to 24 carbon atoms,
  n=a number from 2 to 20,
  m=a number from 1 to 5,
d) balance water,
wherein the components a) and c) are present in a weight ratio of cyanamide to nonionic surfactant in the range from 500:1 to 5:1.

According to a preferred embodiment, the subject of the present invention is a solution containing cyanamide, which comprises:
a) 15 to 60% by weight cyanamide,
b) 0.01 to 4% by weight of a stabilizer containing one or more compounds from the group of phosphorus-containing acids or the salts thereof,
c) 0.01 to 4% by weight of a nonionic surfactant containing one or more compounds from the group of ethoxylates according to formula (I), fatty alcohol glucosides according to formula (II) or mixtures thereof, wherein for formula (I) and (II) the following applies,

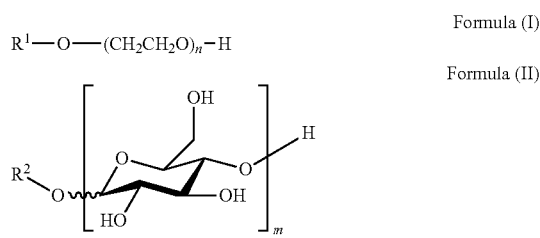

Formula (I)

Formula (II)

wherein for the radicals $R^1$, $R^2$ and the indices n, m the following applies, together or independently:
  $R^1$=a linear or branched alkyl or alkenyl group having 6 to 24 carbon atoms, a partially or fully fluorinated alkyl group having 6 to 18 carbon atoms, a phenyl group, an alkyl-substituted phenyl group, a mono- or polyfunctional siloxane group,
  $R^2$=a linear or branched alkyl or alkenyl group having 6 to 24 carbon atoms,
  n=a number from 2 to 20,
  m=a number from 1 to 5,
d) 0 to 6% by weight dicyandiamide,
e) 0 to 5% by weight of formulation adjuvant, and
f) balance water,
wherein components a) and c) are present in a weight ratio of cyanamide to nonionic surfactant in the range from 500:1 to 5:1.

Surprisingly, it has been found that inventive aqueous cyanamide solutions with the addition of a nonionic surfactant have a clearly improved storage stability with respect to non-surfactant containing solutions. In this context, it has been found that the degradation of cyanamide in these surfactant-containing solutions takes place to a much lesser extent compared to known solutions containing known stabilizers. Thus, these surfactant-containing cyanamide solutions represent a technically and economically improved composition of substances. In particular, aqueous cyanamide solutions with the addition of a nonionic surfactant from the group of ethoxylates according to formula (I), fatty alcohol glucosides according to formula (II) or mixtures thereof, show a significantly improved storage stability with respect to compositions not containing surfactants as well as with respect to solutions containing cyanamide, which contain an anionic surfactant. In addition, it has also been found that the formation of dicyandiamide in aqueous cyanamide solutions according to the invention with addition of a nonionic surfactant from the group of ethoxylates according to formula (I), the fatty alcohol glucosides according to formula (II) or mixtures thereof can be significantly lowered.

Solutions containing cyanamide according to the invention can be used in a large number of applications, in particular in agriculture for regulating plant growth. It has also been found that nonionic surfactants are to be used without restriction for this purpose. It is known that nonionic surfactants from the group of ethoxylates according to formula (I), fatty alcohol glucosides according to formula (II) or mixtures thereof, for example, can be used as spreading agents in agriculture. However, it is not known that these compounds have a stabilizing effect on cyanamide containing solutions. In particular, it is not known that these surfactants have an additional stabilizing effect with respect to known stabilizer systems for solutions containing cyanamide. These facts are totally surprising and not predictable when considered together.

In this case, a solution containing cyanamide according to the invention comprises or contains at least 15% by weight cyanamide. Essential is here, that the cyanamide ($CH_2N_2$, CAS No. 420-04-2) is used as such and not as a salt.

Particularly preferably, a solution containing cyanamide according to the invention contains at least 20% by weight cyanamide, more preferably at least 25% by weight cyanamide, more preferably at least 30% by weight cyanamide and most preferably at least 35% by weight cyanamide. At the same time, or independently thereof, the solution containing cyanamide can comprise or contain, according to the invention, cyanamide up to an amount of 60% by weight, preferably up to an amount of 52% by weight, more preferably up to an amount of 45% by weight and in particular preferably up to an amount of 42% by weight. Particularly preferably, the solution containing cyanamide comprises or contains 30 to 60% by weight of cyanamide and most preferably 35 to 52% by weight cyanamide. Thus, solutions containing cyanamide can be provided with a long shelf life and which simultaneously comply with the prevailing regulations for the transport of solutions containing cyanamide.

According to the invention, a solution containing cyanamide according to the present invention comprises or contains a nonionic surfactant containing one or more compounds from the group of ethoxylates according to formula (I), fatty alcohol glucosides according to formula (II) or mixtures thereof, wherein for the radicals $R^1$, $R^2$ and the indices m, n the following applies, simultaneously or independently:

$R^1$=a linear or branched alkyl or alkenyl group having 6 to 24 carbon atoms, a partially or completely fluorinated alkyl group having 6 to 18 carbon atoms, a phenyl group, an alkyl-substituted phenyl group, a mono- or polyfunctional siloxane group, $R^2$=a linear or branched alkyl or alkenyl group having 6 to 24 carbon atoms n=a number from 2 to 20, m=a number from 1 to 5.

In the context of the present invention, a linear or branched alkyl group having 6 to 24 carbon atoms is intended to mean an alkyl group, having a total of 6 to 24 carbon atoms, and in particular with the general formula $C_nH_{2n+1}$ wherein n=an integer from 6 to 24.

It is preferably provided that $R^1$ and/or $R^2$ are a linear alkyl group selected from the group n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosanyl, n-heneicosanyl, n-docosanyl, n-tricosanyl or n-tetracosanyl. These linear alkyl groups may in turn be substituted with one or more alkyl groups such that branched alkyl groups result. Thus, according to a further, preferred embodiment, $R^1$ and/or $R^2$ can also denote a branched alkyl group selected from the group n-hexyl, n-heptyl, n-octyl, n-nonyl, n-decyl, n-undecyl, n-dodecyl, n-tridecyl, n-tetradecyl, n-pentadecyl, n-hexadecyl, n-heptdecyl, n-octadecyl, n-nonadecyl, n-eicosanyl, n-heineicosanyl, n-docosanyl, n-tricosanyl or n-tetracosanyl, wherein these groups are in turn substituted with one or more C1 to C12 alkyl groups, in which C1 to C12 alkyl may further preferably mean methyl, ethyl, n-propyl, n-butyl, n-pentyl, n-hexyl, n-heptyl, n-octyl, n-nonyl, n-decyl, n-undecyl or n-dodecyl.

Preferably radicals $R^1$ and/or $R^2$ are linear alkyl groups having 8 to 18 carbon atoms, in particular even-numbered, linear alkyl groups having 8 to 18 carbon atoms, in particular also in a mixture with each other, as in the case where they are obtained from natural fats.

Alternatively, preferably, within the scope of the present invention it is also provided that $R^1$ and/or $R^2$ represent a branched alkyl group having 8 to 18 carbon atoms, in particular an odd-numbered, branched alkyl group having 8 to 18 carbon atoms.

In the context of the present invention a linear or branched alkyl group having 8 to 18 carbon atoms should be understood as an alkyl group which has a total of 8 to 18 carbon atoms, and in particular having the general formula $C_nH_{2n+1}$, in which n=an integer from 8 to 18.

Thus, $R^1$ and/or $R^2$ is preferably mean n-octyl, n-nonyl, n-decyl, n-undecyl, n-dodecyl, n-tridecyl, n-tetradecyl, n-pentadecyl, n-hexadecyl, n-heptadecyl and n-octadecyl. Particularly preferably, $R^1$ and/or $R^2$ are n-octyl, n-decyl, n-dodecyl, n-tetradecyl, n-hexadecyl and n-octadecyl.

Alternatively, $R^1$ and/or $R^2$ thus preferably are n-heptyl, n-octyl, n-nonyl, n-decyl, n-undecyl, n-dodecyl, n-tridecyl, n-tetradecyl, these groups being in turn substituted with one or more C1 to C5 alkyl groups, wherein C1 to C5 alkyl can furthermore preferably be methyl, ethyl, n-propyl, n-butyl or n-pentyl. Particularly preferably $R^1$ and/or $R^2$ are n-octyl, n-decyl or n-dodecyl, in which these groups are in turn substituted one or multiple times with methyl or n-propyl.

$R^1$ and/or $R^2$ may further represent a linear or branched alkenyl group having 6 to 24 carbon atoms, such alkenyl group having at least one double bond.

In the context of the present invention, in particular, a linear or branched alkenyl group having 6 to 24 carbon atoms is intended to be an alkenyl group, which i) has a total of 6 to 24 carbon atoms and a double bond, and which in particular has the general formula: $C_nH_{2n-1}$, wherein n=an integer from 6 to 24, or ii) has a total of 6 to 24 carbon atoms and two double bonds, and which in particular has the general formula $C_nH_{2n-3}$, wherein n=an integer from 6 to 24 or iii) has a total of 6 to 24 carbon atoms and three double bonds, and in particular has the general formula $C_nH_{2n-5}$, where n=an integer from 6 to 24. These alkenyl groups can be linear, thus unbranched, or branched.

It is provided in particular that $R^1$ and/or $R^2$ is a linear alkenyl group selected from among hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, hexadienyl, heptadienyl, octadienyl, nonadienyl, decadienyl, undecadienyl, dodecadienyl, tridecadienyl, tetradecadienyl, pentadecadienyl, hexadecadienyl, heptadecadienyl, octadecadienyl, nonadecadienyl, eicosadienyl, hexatrienyl, heptatrienyl, octatrienyl, nonatrienyl, decatrienyl, undecatrienyl, dodecatrienyl, tridecatrienyl, tetradecatrienyl, pentadecatrienyl, hexadecatrienyl, heptadecatrienyl, octadecatrienyl, nonadecatrienyl or eicosatrienyl. These linear alkenyl groups may in turn be substituted with one or more alkyl groups or alkenyl groups to give branched alkenyl groups. Thus, according to a further, preferred embodiment, $R^1$ and/or $R^2$ can also be a branched alkenyl group selected from the group hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, hexadienyl, heptadienyl, octadienyl, nonadienyl, decadienyl, undecadienyl, dodecadienyl, tridecadienyl, tetradecadienyl, pentadecadienyl, hexadecadienyl, heptadecadienyl, octadecadienyl, nonadecadienyl, eicosadienyl, hexatrienyl, heptatrienyl, octatrienyl, nonatrienyl, decatrienyl, undecatrienyl, dodecatrienyl, tridecatrienyl, tetradecatrienyl, pentadecatrienyl, hexadecatrienyl, heptadecatrienyl, octadecatrienyl, nonadecatrienyl or eicosatrienyl, which in turn are substituted with one or more C1 to C12 alkyl groups or one or more C2 to C12 alkenyl groups, wherein C1 to C12 alkyl is still preferably methyl, ethyl, n-propyl, n-butyl, n-pentyl, n-hexyl, n-heptyl, n-octyl, n-nonyl, n-decyl, n-undecyl, or n-dodecyl, and wherein C2 to C12 alkenyl can further preferably mean vinyl, allyl, butenyl, pentenyl, hexenyl, heptenyl, octenyl, nonenyl, decenyl, undecenyl or dodecenyl.

The radicals $R^1$ and/or $R^2$ are preferably linear alkenyl groups having 8 to 18 carbon atoms, in particular even, linear alkenyl groups having 8 to 18 carbon atoms, in particular in admixture with each other, as those that can be obtained from natural fats.

In the context of the present invention, a linear alkenyl group having 8 to 18 carbon atoms is understood to mean an alkenyl group having a total of 8 to 18 carbon atoms and a double bond, and in particular with the general formula $C_nH_{2n-1}$, in which n=an integer from 8 to 18.

Thus, $R^1$ and/or $R^2$ is preferably octenyl, nonenyl, decenyl, undecenyl, dodecenyl, tridecenyl, tetradecenyl, pentadecenyl, hexadecenyl, heptadecenyl and octadecenyl. Particularly preferably $R^1$ and/or $R^2$ mean octenyl, decenyl, dodecenyl, tetradecenyl, hexadecenyl, and octadecenyl.

Furthermore, in the context of the present invention, a phenyl group is a non-substituted aromatic radical of the formula $C_6H_5$. In contrast, an alkyl-substituted phenyl group is a phenyl group substituted by at least one alkyl group, wherein in this context alkyl preferably is C1 to C10 alkyl, and C1 to C10 alkyl furthermore preferably represents methyl, ethyl, n-propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 1,1-dimethylpropyl, 1,2-dimethylpropyl, 2,2-dimethylpropyl, 1-ethylpropyl, n-hexyl, n-heptyl, n-octyl, n-nonyl, 7-methyloctyl, 2,4-dimethyl-3-heptyl or n-decyl.

Furthermore, in the context of the present invention, a siloxane group which is a monofunctional or polyfunctional siloxane group should be understood as meaning a siloxane group, which can be produced by mixed hydrolysis from
a) one or more chlorosilanes from the group of trimethylchlorosilane, dimethyldichlorosilane and methyltrichlorosilane, and
b) one or more chlorosilanes substituted with 3-heteropropyl from the group of 3-heteropropyl-trichlorosilane, 3-heteropropyl-methyldichlorosilane and 3-heteropropyl-dimethylchlorosilane, wherein 3-heteropropyl is: 3-chloropropyl, 3-hydroxypropyl or 3-(hydroxyethoxy)propyl.

Typical mono- or polyfunctional siloxane groups which can be prepared from these building blocks are indicated in the following formulas, in which formula (III) stands for a monofunctional siloxane group, formula (IV) stands for a bifunctional siloxane and formulas (V) and (Va) stand for a v-functional siloxane group, and wherein, for the formulas (III), (IV), (V) and (Va), the following applies:

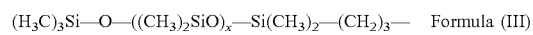

Formula (III)

wherein for the index x the following applies:
x=a number from 0 to 15, in particular a number from 0 to 10,
in particular a number from 3 to 10,

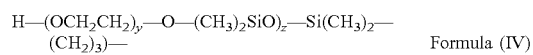

Formula (IV)

wherein, for the indices y and z, the following applies:
y=a number from 2 to 20, in particular a number from 2 to 10, in particular a number from 3 to 10,
z=a number from 0 to 10, in particular a number from 0 to 5, in particular a number from 1 to 3,

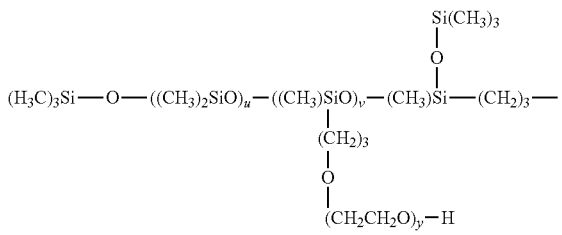

Formula (V)

where for the indices y, u and v the following applies:
y=a number from 2 to 20, in particular a number from 2 to 10, in particular a number from 3 to 10,
u=a number from 0 to 15, in particular a number from 0 to 10, in particular a number from 0 to 3,
v=a number from 0 to 4, in particular a number from 0 to 3.

Particularly preferred are v-functional siloxane groups, in particular siloxane groups of formula (Va), which represents a special case of the formula (V) for u=v=0, where for formula (Va), the following applies:

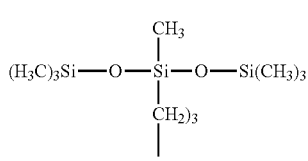

Formula (Va)

According to a particularly preferred embodiment, it is provided that as a nonionic surfactant an ethoxylate according to formula (I) is used, wherein for the radical $R^1$ and the index n the following applies:
$R^1$=a linear or branched alkyl group having 8 to 18 carbon atoms, alkyl-substituted phenyl group,
a monofunctional siloxane of the formula (II) where x=a number from 3 to 10,
a bifunctional siloxane of the formula (IV) with z=a number from 1 to 3 and y=a number from 2 to 10, or
a polyfunctional siloxane group of the formula (V) with u=a number from 0 to 3 and v=a number from 0 to 3 and y=a number from 2 to 10, in particular a number from 3 to 10,
n=a number from 2 to 20, in particular a number from 2 to 10, in particular a number from 3 to 10.

According to a further preferred embodiment, as a nonionic surfactant, it is also possible to use a mixture of different ethoxylates according to formula (I). In this case a mixture of at least two different ethoxylates according to formula (I), has been found to be very effective, wherein for the radical $R^1$ and the index n the following applies:
$R^1$=a polyfunctional siloxane group of formula (V) with u=a number from 0 to 3 and v=a number from 0 to 3 and y=a number from 2 to 10,
n=a number from 2 to 20, in particular a number from 2 to 10, in particular a number from 3 to 10.

According to a further preferred embodiment, as a nonionic surfactant, it is also possible to use a mixture of different ethoxylates according to formula (I). In this case, a mixture of at least two different ethoxylates according to formula (I) has been found to be particularly effective, in which for the radical $R^1$ and the index n the following applies:
$R^1$=n-dodecyl, n-hexadecyl and n-octadecyl,
n=a number from 2 to 20, in particular a number from 2 to 10.

Very particular preference is given to ethoxylates of the formula (I) wherein for the radical $R^1$ and the index n the following applies:
$R^1$=n-dodecyl, n-tetradecyl, n-hexadecyl, n-octadecyl, methyldecyl, methyldodecyl, methyltetradecyl, or a siloxane of the formula (Va),
n=a number from 4 to 8.

According to an alternative preferred embodiment, it is provided that a fatty alcohol glucoside according to formula (II) is used as the nonionic surfactant, wherein the following applies to the radical $R^2$ and the index m:
$R^2$=linear alkyl group having 8 to 18 carbon atoms,
m=a number from 2 to 5.

Very particular preference is given to fatty alcohol glucosides of the formula (II) where the following applies to the radical $R^2$ and the index m:
$R^2$=n-hexadecyl or n-octadecyl,
m=a number from 3 to 5.

These particularly preferred nonionic surfactants provide a particularly good storage stability. Thus, aqueous solutions containing cyanamide, containing, in addition to the known stabilizers, a nonionic surfactants of the type mentioned, can be exported even in regions with average temperatures of more than 30° C. in the shade, without cooling being necessary.

Within the scope of the study underlying the invention it has been found that these surfactants in an amount of 0.01 to 4% by weight based on the total amount of solution, have a stabilizing effect, provided that the weight ratio of cyanamide to nonionic surfactant is set in the range from 500:1 to 5:1. It should be emphasized here that the surfactant used here can be used as such or in a mixture with one more surfactants of the formula (I) and/or the formula (II). Particularly good stabilizations could be achieved by adjusting the weight ratio of cyanamide to nonionic surfactant in the range from 100:1 to 5:1. Thus, according to a particularly preferred embodiment of the invention, it is also provided that the components a) and c) are present in a weight ratio of cyanamide to nonionic surfactant in the range from 100:1 to 5:1, preferably in the range from 80:1 to 5:1, more preferably in the range from 50:1 to 5:1, further preferably in the range from 30:1 to 5:1, more preferably in the range from 20:1 to 5:1 and very particularly preferably in the range from 10:1 to 5:1.

According to the present invention, a solution containing cyanamide contains 0.01 to 4% by weight, preferably 0.01 to 3% by weight and particularly preferably 0.01 to 2% by weight, of a stabilizer containing one or more compounds from the group of phosphorus-containing acids or the salts thereof. Orthophosphoric acid ($H_3PO_4$) can particularly preferably be used here as the phosphorus-containing acid. Should salts of these phosphorus-containing acids be used, salts of the ortho-phosphoric acid can preferably be used. Particularly preferably, as a salt of the phosphorus-containing acid, ammonium dihydrogen phosphate, diammonium hydrogen phosphate, sodium dihydrogen phosphate, disodium hydrogen phosphate, potassium dihydrogen phosphate, dipotassium hydrogen phosphate or magnesium hydrogen phosphate can be used.

At the same time or independently thereof, the stabilizer may contain one or more compounds from the group of phosphorus-containing acids and the salts thereof, which form a buffer when combined. A buffer is a mixture of substances, whose pH value (concentration of oxonium ions), when adding an acid or a base, changes much less than would be the case in an unbuffered system. The effect of the buffer is based on the transformation of the oxonium ions ($H_3O^+$) or hydroxide ions ($OH^-$) to weak acids or bases, respectively, which in themselves tend little to the formation of $H_3O^+$ or $OH^-$ ions.

Most preferably, a solution containing cyanamide according to the present invention may contain a stabilizer containing one or more compounds from the group of phosphorus-containing acids or their salts, forming a buffer, and which, more preferably, are blended in such a ratio, that in the solution containing cyanamide a buffer capacity of 0.1 to 100 mol/l (25° C.), preferably 0.2 to 50 mmol/l (25° C.), more preferably 1 to 10 mmol/(25° C.) is set. Thus, adjusted solutions containing cyanamide are particularly storage-stable.

Furthermore, according to a further preferred embodiment, it can also be provided that a solution containing cyanamide according to the present invention has a pH in the range from 3.5 to 5.5, preferably in the range from 3.9 to 4.5. Thus, adjusted solutions containing cyanamide are particularly storage-stable.

Solutions containing cyanamide always have a small proportion of dicyandiamide due to the production. In addition, dicyandiamide is also formed in stabilized aqueous cyanamide solutions. In most applications, dicyandiamide levels in solutions containing cyanamide up to 6% by weight are tolerated. Thus, a solution containing cyanamide according to the invention can also have a proportion of dicyandiamide, wherein the content of dicyandiamide is at most 6% by weight, in particular at most 5% by weight, in particular at most 4% by weight, in particular at most 3% by weight and particularly preferably at most 2% by weight. In particular, freshly prepared solutions containing cyanamide contain at most 2% by weight of dicyandiamide.

Due to the particular stabilization due to the inventive use of nonionic surfactants containing one or more compounds selected from the group of ethoxylates according to formula (I), fatty alcohol glucosides according to Formula (II) or mixtures thereof, the present invention also comprises a solution containing cyanamide, which has a content of dicyandiamide of at most 6% by weight, in particular of at most 5% by weight, in particular of at most 4% by weight after a storage time of 180 days at a temperature of 30° C.

In a further advantageous embodiment of the invention, a solution containing cyanamide according to the invention at a temperature of 25° C. has a surface tension of less than 70 mN/m, preferably less than 60 mN/m, and most preferably less than 40 mN/m, wherein simultaneously or independently it may be provided that the solution at a temperature of 25° C. has a surface tension of at least 5 mN/m.

In a further advantageous embodiment of the invention, a solution containing cyanamide according to the invention at a temperature of 25° C. has a viscosity of less than 1 Pa's. The solutions of the invention preferably have a viscosity of less than 500 mPa's, more preferably less than 100 mPa's, and even more preferably less than 50 mPa's at 25° C.

Within the scope of the present invention, it can further be provided that the solution containing cyanamide can comprise or contain further ingredients, namely formulation adjuvants. It is preferably provided that the solution containing cyanamide comprises or contains at least one formulation adjuvant, in particular from the group of viscosity modifiers, dyes, markers and bitter substances. These formulation adjuvants may be comprised or contained in the solution in an amount of up to 5% by weight. In contrast to the inventively contained nonionic surfactants, these formulation adjuvants however have no effect on the storage stability of the solutions containing cyanamide and serve exclusively application-specific requirements.

It is particularly preferred to provide that the formulation adjuvants are comprised or contained in an amount up to 4% by weight, more preferably up to 3% by weight and in particular preferably up to 2% by weight. Should the solution containing cyanamide according to the invention have formulation adjuvants due to application-specific requirements, the solution containing cyanamide can preferably comprise or contain 0.01% by weight of formulation adjuvants, in particular 0.1% by weight.

It should be emphasized that in the context of the present invention, a formulation adjuvant should not be understood to mean oil, in particular no oil from the group of natural oils, in particular oils of animal or vegetable origin, and synthetic oils. A solution containing cyanamide according to the present invention also includes or contains no oil, in particular, no oil from the group of natural oils, in particular oils of animal or vegetable origin, and synthetic oils.

Thus, the present invention also comprises a solution containing cyanamide comprising or containing:
a) 15 to 60% by weight cyanamide,
b) 0.01 to 4% by weight of a stabilizer containing one or more compounds from the group of phosphorus-containing acids or their salts,
c) 0.01 to 4% by weight of a nonionic surfactant selected from the group of ethoxylates of the formula (I), fatty alcohol glucosides of the formula (II) or mixtures thereof,
d) 0 to 6% by weight dicyandiamide,
e) 0.01% to 5% by weight of formulation adjuvant, and
f) balance water,
wherein components a) and c) are present in a weight ratio of cyanamide to nonionic surfactant in the range from 500:1 to 5:1.

Most preferably, a solution containing cyanamide according to the present invention comprises or contains
a) 35 to 52% by weight cyanamide,
b) 0.01 to 4% by weight of a stabilizer containing one or more compounds from the group of phosphorus-containing acids or their salts,
c) 0.01 to 4% by weight of a nonionic surfactant selected from group of ethoxylates of the formula (I), fatty alcohol glucosides of the formula (II) or mixtures thereof,
d) 0.01 to 4% by weight dicyandiamide,
e) 0.01% to 4% by weight of formulation adjuvants, and
f) balance water,
wherein components a) and c) are present in a weight ratio of cyanamide to nonionic surfactant in the range from 500:1 to 5:1.

The aqueous solutions containing cyanamide described herein have an improved storage stability in comparison to known, aqueous already stabilized cyanamide solutions, and are well suited for the regulation of plant growth or as a formulation for a cyanamide-containing plant growth regulator. Thus, the scope the present invention also comprises a preparation prepared from or with this aqueous solution containing cyanamide of the present invention.

Furthermore, the use of the herein described solution containing cyanamide or a preparation provided by using this aqueous cyanamide containing solution as an agent for regulating plant growth, in particular as a fertilizer or as a plant growth regulator, is comprised in the present invention.

Furthermore, the present invention also comprises the use of a nonionic surfactant containing one or more compounds selected from the group of ethoxylates according to formula (I), fatty alcohol glucosides according to formula (II) or mixtures thereof, for the stabilization of solutions containing cyanamide, in particular for the stabilization of solutions containing cyanamide of the composition described herein, wherein for formula (I) and (II) the following applies,

Formula (I)

Formula (II)

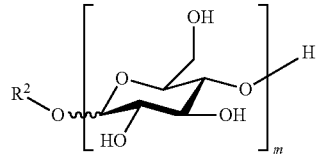

wherein for the radicals $R^1$, $R^2$ and the indices n, m the following applies, together or independently:
$R^1$=a linear or branched alkyl or alkenyl group having 6 to 24 carbon atoms, a partially or completely fluorinated alkyl group having 6 to 18 carbon atoms, a phenyl group, an alkyl-substituted phenyl group, a mono- or polyfunctional siloxane group, $R^2$=a linear or branched alkyl or alkenyl group having 6 to 24 carbon atoms, n=a number from 2 to 20, m=a number from 1 to 5.

The following examples are intended to explain the invention in further detail.

EXAMPLES

1) Raw Materials Used
   a) industrial, ground calcium cyanamide (manufacturer: AlzChem AG) with 23.1% total nitrogen content, 22.2% cyanamide nitrogen and 0.1% calcium carbide content.
   b) commercial 85% phosphoric acid
   c) magnesium hydrogen phosphate-trihydrate of the formula $MgHPO_4 \cdot 3H_2O$, manufacturer: Aldrich. Order no. M1265
   d) ethoxylated iso-tridecanol having an average of 5 ethylene oxide units, trade name: MARLIPAL 013/50™ produced by Evonik
   e) ethoxylated trisiloxane, trade name: BREAK-THRU S240™ produced by Evonik
   f) octadecyl polyglucoside having an average of 3 glucose units, trade name: COGNIS APG™ from Cognis
   g) nonyl phenyl ethoxylate with an average of 5 ethylene oxide units, trade name: TRITON N-57™ from Dow Chemical
   h) sodium stearate from TCI Europe, order no. S00081
   i) sodium dodecyl sulphate from Aldrich, no. 436143

II) Methods of Analysis
   a) The cyanamide content was determined by potentiometric titration with silver nitrate against a silver electrode. The solvent was prepared as follows: 10 ml of a 1 molar sodium hydroxide solution and 20 ml of a 2 molar ammonia solution were mixed with 330 ml of ethanol and filled up with water to 1000 ml. A weight corresponding to about 5 mg cyanamide was placed in 50 ml of this solvent and titrated with a 0.05 molar silver nitrate solution, wherein yellow silver cyanamide $Ag_2NCN$ precipitated. The titration endpoint for the evaluation corresponded to the inflection point of the potential at the silver electrode.
   b) Dicyandiamide (DCD) was determined by reverse phase HPLC against an external standard of known content. Column used: Nucleosil 5 C-18 at 20° C. Mobile phase: 1% methanol in water. Detection wavelength: 220 nm.
   c) The pH was measured by means of a calibrated glass electrode (AgCl/Ag reference electrode) without further sample preparation.
   d) Phosphate was isolated by means of ion chromatography against an external standard with known phosphate content. Column used: Dionex HPIC AS3 at 20° C. Buffered high purity water with an addition of 233 ppm sodium carbonate and 235 ppm sodium bicarbonate were used as a mobile phase. Detection by means of conductivity sensor.

III) Test Method for Storage of the investigated Cyanamide Solutions 250 ml soda glass narrow mouth bottles were washed with deionized purified water to remove adhering traces of alkali. 200 g of the solution to be examined were each filled into a bottle prepared in this way. The bottles to be tested were each stored in a calibrated convection drying cabinet at an internal temperature of 30 or 60° C. For each test temperature and each test period, a separate bottle was used. After the end of the test period, the respective bottle was removed from the drying cabinet, cooled to 20° C. and examined with regard to cyanamide, DCD and pH according to the above analysis methods.

The examined test periods were:

at 60° C. (accelerated storage test): 24 hours, 48 hours and 96 hours, respectively at 30° C. (normal storage test): 90 or 180 days IV) Preparation of the Aqueous Cyanamide-Containing Compositions (Solutions)

Solution 1a)

720 kg of industrial, ground calcium cyanamide were reacted with 800 kg of process water at 20° C. under a pressure of 3 bar with technically pure carbon dioxide gas. The precipitated calcium carbonate was filtered off together with the insoluble by-products contained in the lime nitrogen (including graphite). The filtrate was adjusted from pH 6.9 to pH 4.0 with 2.3 kg of 85% phosphoric acid. The resulting 33% cyanamide solution (about 1000 kg) was partially evaporated under reduced pressure (about 20 mbar) at 30-40° C. About 650 kg of the sample solution 1a were obtained as distillation residue. This sample solution 1a had the following composition:

cyanamide content: 50.7%, dicyandiamide content 0.8%, pH 4.3, phosphate content 0.3%.

Solution 1 b)

720 kg of industrial calcium cyanamide were reacted with 800 kg of process water at 20° C. under a pressure of 3 bar with technically pure carbon dioxide gas. The precipitated calcium carbonate was filtered off together with insoluble by-products (including graphite) contained in calcium cyanamide. The filtrate was mixed with 1.4 kg of magnesium hydrogen phosphate trihydrate and adjusted from pH 5.6 to pH 4.3 with 1.3 kg of 85% phosphoric acid. The obtained cyanamide solution of about 33% was partially evaporated at 30-40° C. under reduced pressure (about 20 mbar). Approximately 630 kg of the sample solution 1b were obtained as distillation residue. These sample solution 1b had the following composition:

cyanamide content: 51.1%, dicyandiamide content 0.8%, pH 4.5, phosphate content 0.3%, magnesium content; 0.03%.

Solution 1c)

720 kg of industrial calcium cyanamide were reacted with 800 kg of process water at 20° C. under a pressure of 3 bar with technically pure carbon dioxide gas. The precipitated calcium carbonate was filtered off together with the insoluble by-products contained in the lime nitrogen (including graphite). The filtrate was mixed with 1.4 kg of magnesium hydrogen phosphate trihydrate and brought from pH 5.6 to pH 4.3 by means of 3 kg of 85% strength phosphoric acid. The obtained about 33% cyanamide solution was partially evaporated at 30-40° C. under reduced pressure (about 20 mbar). About 800 kg of the sample solution 1c were obtained as a distillation residue. This sample solution 1c had the following composition:

cyanamide content: 40.2%, dicyandiamide content 0.6%, pH 4.3, phosphate content 0.2%, magnesium content; 0.02%.

Surfactant-Containing Solutions 2a to 7b

The surfactant-containing solutions 2a to 7b were prepared by adding 990 g of the starting solutions 1a or 1b or 1c by adding 10 g of each specified surfactant and the mixture was stirred to homogeneity. The cyanamide concentration of the starting solutions is thereby slightly reduced, which has been confirmed by appropriate analyses. The pH did not change in a measurable way when using the nonionic surfactants according to the invention. When using anionic surfactants, the pH changed in some cases significantly.

TABLE 1a aqueous cyanamide-containing composition (according to the invention)

| No. | Content of cyanamide | Stabilizer | Nonionic surfactant |
|---|---|---|---|
| 1a (comparison) | 50.7% by weight | 0.3% by weight of phosphate | none |
| 1b (comparison) | 50.1% by weight | 0.3% by weight of phosphate 0.03% by weight $Mg^{2+}$ | none |
| 1c (comparison) | 40.2% by weight | 0.2% by weight of phosphate 0.02% by weight $Mg^{2+}$ | none |
| 2a (according to the invention) | 50.2% by weight | 0.3% by weight of phosphate | 1% by weight of ethoxy iso-tridecanol according to I) d) |
| 2b (according to the invention) | 50.6% by weight | 0.3% by weight of phosphate 0.03% by weight $Mg^{2+}$ | 1% by weight of ethoxy iso-tridecanol according to I) d) |
| 2c (according to the invention) | 39.8% by weight | 0.2% by weight of phosphate 0.02% by weight $Mg^{2+}$ | 1% by weight of ethoxy iso-tridecanol according to I) d) |
| 3a (according to the invention) | 50.2% by weight | 0.3% by weight of phosphate | 1% by weight of ethoxy trisiloxane according to I) e) |
| 3b (according to the invention) | 50.6% by weight | 0.3% by weight of phosphate 0.03% by weight $Mg^{2+}$ | 1% by weight of ethoxy trisiloxane according to I) e) |
| 3c (according to the invention) | 39.8% by weight | 0.2% by weight of phosphate 0.02% by weight $Mg^{2+}$ | 1% by weight of ethoxy trisiloxane according to I) e) |
| 4a (according to the invention) | 50.2% by weight | 0.3% by weight of phosphate | 1% by weight octadecyl-polyglucoside according to I) f) |
| 4b (according to the invention) | 50.6% by weight | 0.3% by weight of phosphate 0.03% by weight $Mg^{2+}$ | 1% by weight octadecyl-polyglucoside according to I) f) |
| 5a (according to the invention) | 50.2% by weight | 0.3% by weight of phosphate | 1% by weight of ethoxy nonylphenol according to I) g) |
| 5b (according to the invention) | 50.6% by weight | 0.3% by weight of phosphate 0.03% by weight $Mg^{2+}$ | 1% by weight of ethoxy nonylphenol according to I) g) |

TABLE 1b aqueous cyanamide-containing composition (not according to the invention)

| No. | Content of cyanamide | Stabilizer | Anionic surfactant |
|---|---|---|---|
| 6a (not according to the invention) | 50.2% by weight | 0.3% by weight of phosphate | 1% by weight of Na stearate according to I)h) |
| 6b (not according to the invention) | 50.6% by weight | 0.3% by weight of phosphate 0.03% by weight $Mg^{2+}$ | 1% by weight of Na stearate according to I)h) |
| 7a (not according to the invention) | 50.2% by weight | 0.3% by weight of phosphate | 1% by weight of Na dodecylsulfate according to I)i) |
| 7b (not according to the invention) | 50.6% by weight | 0.3% by weight of phosphate 0.03% by weight $Mg^{2+}$ | 1% by weight of Na dodecylsulfate according to I)i) |

TABLE 2a

Storage stability of the compositions according to Table 1a - at 60° C.

| No. | Investigated values | Initial value | After 24 hours | After 48 hours | After 96 hours |
|---|---|---|---|---|---|
| 1a | pH value | 4.3 | 5 | 5.6 | |
| | Content of cyanamide [% by weight] | 50.7 | 49.2 | 47.2 | |
| | Content of DCD [% by weight] | 0.8 | 2.3 | 4.3 | |
| 1b | pH value | 4.5 | | 5.1 | 5.8 |
| | Content of cyanamide [% by weight] | 51.1 | | 49.6 | 46.0 |
| | Content of DCD [% by weight] | 0.8 | | 2.1 | 5.8 |
| 1c | pH value | 4.3 | | 5.0 | 5.6 |
| | Content of cyanamide [% by weight] | 40.2 | | 38.8 | 35.9 |
| | Content of DCD [% by weight] | 0.6 | | 1.8 | 4.6 |
| 2a | pH value | 4.3 | 4.6 | 5.1 | |
| | Content of cyanamide [% by weight] | 50.2 | 49.5 | 47.5 | |
| | Content of DCD [% by weight] | 0.8 | 1.7 | 3.1 | |
| 2b | pH value | 4.5 | | 4.8 | 5.3 |
| | Content of cyanamide [% by weight] | 50.6 | | 49.8 | 46.9 |
| | Content of DCD [% by weight] | 0.8 | | 1.7 | 4.2 |
| 2c | pH value | 4.3 | | 4.7 | 5.4 |
| | Content of cyanamide [% by weight] | 39.8 | | 39.3 | 36.6 |
| | Content of DCD [% by weight] | 0.6 | | 1.5 | 3.9 |
| 3a | pH value | 4.3 | 4.7 | 5.2 | |
| | Content of cyanamide [% by weight] | 50.2 | 49.3 | 47.7 | |
| | Content of DCD [% by weight] | 0.8 | 1.8 | 3.3 | |
| 3b | pH value | 4.5 | | 4.7 | 5.3 |
| | Content of cyanamide [% by weight] | 50.6 | | 49.7 | 47.1 |
| | Content of DCD [% by weight] | 0.8 | | 1.7 | 4.4 |
| 3c | pH value | 0.6 | | 4.8 | 5.3 |
| | Content of cyanamide [% by weight] | 39.8 | | 39.2 | 36.8 |
| | Content of DCD [% by weight] | 4.3 | | 1.4 | 3.6 |
| 4a | pH value | 4.3 | 4.6 | 5.2 | |
| | Content of cyanamide [% by weight] | 50.2 | 49.4 | 47.9 | |
| | Content of DCD [% by weight] | 0.8 | 1.6 | 3.0 | |

TABLE 2a-continued

Storage stability of the compositions according to Table 1a - at 60° C.

| No. | Investigated values | Initial value | After 24 hours | After 48 hours | After 96 hours |
|---|---|---|---|---|---|
| 4b | pH value | 4.5 | | 4.9 | 5.4 |
| | Content of cyanamide [% by weight] | 50.6 | | 49.8 | 47.2 |
| | Content of DCD [% by weight] | 0.8 | | 1.6 | 4.1 |
| 5a | pH value | 4.3 | 4.6 | 5.1 | |
| | Content of cyanamide [% by weight] | 50.2 | 49.3 | 47.8 | |
| | Content of DCD [% by weight] | 0.8 | 1.7 | 3.2 | |
| 5b | pH value | 4.5 | | 4.8 | 5.3 |
| | Content of cyanamide [% by weight] | 50.6 | | 49.7 | 47.1 |
| | Content of DCD [% by weight] | 0.8 | | 1.7 | 4.2 |

TABLE 3a

Storage stability of the compositions according to Table 1a - at 30° C.

| No. | Investigated values | Initial value | After 90 days | After 180 days |
|---|---|---|---|---|
| 1a | pH value | 4.3 | 5.8 | 6.2 |
| | Content of cyanamide [% by weight] | 50.7 | 46.9 | 40.8 |
| | Content of DCD [% by weight] | 0.8 | 4.7 | 10.8 |
| 1b | pH value | 4.5 | 5.0 | 5.8 |
| | Content of cyanamide [% by weight] | 51.1 | 48.6 | 45.0 |
| | Content of DCD [% by weight] | 0.8 | 3.3 | 6.8 |
| 1c | pH value | 4.3 | 4.9 | 5.6 |
| | Content of cyanamide [% by weight] | 40.2 | 37.0 | 35.2 |
| | Content of DCD [% by weight] | 0.6 | 2.8 | 5.5 |
| 2a | pH value | 4.3 | 4.8 | 5.9 |
| | Content of cyanamide [% by weight] | 50.2 | 47.6 | 43.4 |
| | Content of DCD [% by weight] | 0.8 | 3.5 | 7.8 |
| 2b | pH value | 4.5 | 4.7 | 5.3 |
| | Content of cyanamide [% by weight] | 50.6 | 48.9 | 46.1 |
| | Content of DCD [% by weight] | 0.8 | 2.6 | 4.9 |
| 2c | pH value | 4.3 | 4.7 | 5.4 |
| | Content of cyanamide [% by weight] | 39.8 | 37.9 | 36.4 |
| | Content of DCD [% by weight] | 0.6 | 2.1 | 4.5 |
| 3a | pH value | 4.3 | 4.8 | 5.9 |
| | Content of cyanamide [% by weight] | 50.2 | 47.5 | 43.5 |
| | Content of DCD [% by weight] | 0.8 | 3.4 | 7.7 |
| 3b | pH value | 4.5 | 4.8 | 5.3 |
| | Content of cyanamide [% by weight] | 50.6 | 48.0 | 46.5 |
| | Content of DCD [% by weight] | 0.8 | 2.4 | 5 |
| 3c | pH value | 4.3 | 4.7 | 5.3 |
| | Content of cyanamide [% by weight] | 39.8 | 38.0 | 36.8 |
| | Content of DCD [% by weight] | 0.6 | 2.0 | 4.3 |
| 4a | pH value | 4.3 | 4.7 | 5.7 |
| | Content of cyanamide [% by weight] | 50.2 | 47.3 | 43.3 |
| | Content of DCD [% by weight] | 0.8 | 3.3 | 7.5 |
| 4b | pH value | 4.5 | 4.7 | 5.3 |
| | Content of cyanamide [% by weight] | 50.6 | 49.1 | 46.5 |
| | Content of DCD [% by weight] | 0.8 | 2.4 | 5.2 |
| 5a | pH value | 4.3 | 4.7 | 5.5 |
| | Content of cyanamide [% by weight] | 50.2 | 47.5 | 43.5 |
| | Content of DCD [% by weight] | 0.8 | 3.5 | 7.4 |
| 5b | pH value | 4.5 | 4.8 | 5.3 |
| | Content of cyanamide [% by weight] | 50.6 | 49.0 | 46.2 |
| | Content of DCD [% by weight] | 0.8 | 2.6 | 5.1 |

TABLE 2b

Storage stability of the compositions according to Table 1b - at 60° C.

| No. | Investigated values | Initial value | After 24 hours | After 48 hours | After 96 hours |
|---|---|---|---|---|---|
| 1a (Comparison) | pH value | 4.3 | 5 | 5.6 | |
| | Content of cyanamide [% by weight] | 50.7 | 49.2 | 47.2 | |
| | Content of DCD [% by weight] | 0.8 | 2.3 | 4.3 | |
| 1b (Comparison) | pH value | 4.5 | | 5.1 | 5.8 |
| | Content of cyanamide [% by weight] | 51.1 | | 49.6 | 46 |
| | Content of DCD [% by weight] | 0.8 | | 2.1 | 5.8 |
| 6a | pH value | 5.7 | 5.9 | 6.4 | |
| | Content of cyanamide [% by weight] | 50.2 | 48 | 44.9 | |
| | Content of DCD [% by weight] | 0.8 | 3.2 | 6.1 | |
| 6b | pH value | 5.6 | | 6.1 | 6.4 |
| | Content of cyanamide [% by weight] | 50.6 | | 48.5 | 42.9 |
| | Content of DCD [% by weight] | 0.8 | | 3 | >10* |
| 7a | pH value | 4.5 | 5.3 | 6.2 | |
| | Content of cyanamide [% by weight] | 50.2 | 48.1 | 45.3 | |
| | Content of DCD [% by weight] | 0.8 | 3 | 5.9 | |
| 7b | pH value | 4.6 | | 5.2 | 6.2 |
| | Content of cyanamide [% by weight] | 50.6 | | 48.9 | 43.5 |
| | Content of DCD [% by weight] | 0.8 | | 2.7 | 7.9 |

*DCD precipitated as a solid

TABLE 3b

Storage stability of the compositions according to Table 1b - at 30° C.

| No. | Investigated values | Initial value | After 90 days | After 180 days |
|---|---|---|---|---|
| 1a (Comparison) | pH value | 4.3 | 5.8 | 6.2 |
| | Content of cyanamide [% by weight] | 50.7 | 46.9 | 40.8 |
| | Content of DCD [% by weight] | 0.8 | 4.7 | 10.8 |
| 1b (Comparison) | pH value | 4.5 | 5.0 | 5.8 |
| | Content of cyanamide [% by weight] | 51.1 | 48.6 | 45.0 |
| | Content of DCD [% by weight] | 0.8 | 3.3 | 6.8 |
| 6a | pH value | 5.7 | 6 | 6.4 |
| | Content of cyanamide [% by weight] | 50.2 | 44.4 | 35.2 |
| | Content of DCD [% by weight] | 0.8 | 6.8 | >10* |
| 6b | pH value | 5.6 | 6 | 6.3 |
| | Content of cyanamide [% by weight] | 50.6 | 46.7 | 41.2 |
| | Content of DCD [% by weight] | 0.8 | 4.7 | >10* |
| 7a | pH value | 4.5 | 5.9 | 6.3 |
| | Content of cyanamide [% by weight] | 50.2 | 44.7 | 35.9 |
| | Content of DCD [% by weight] | 0.8 | 6.4 | >10* |
| 7b | pH value | 4.6 | 5.4 | 6.1 |
| | Content of cyanamide [% by weight] | 50.6 | 47 | 41.7 |
| | Content of DCD [% by weight] | 0.8 | 4.5 | 9.6 |

*DCD precipitated as a solid

Evaluation of the Results

The solution (1a) shows a basic stabilization already sufficient for some applications, which can be improved by adding magnesium phosphate (solution (1b) or (1c)) (corresponding to the prior art). For many applications, however, even this improved stability is not sufficient.

By comparing the stability data of solutions (2a) to (5a) with solution (1a), or (2b) to (5b) with (1b) or (2c) and (3c) with (1c) at 30 (Table 3) or at 60° C. (Table 2) the additional stabilizing effect of nonionic surfactants is evident. The comparison with the stability data of solution (6a) and (7a) or (6b) and (7b) shows that, in contrast, anionic surfactants have a destabilizing effect, and that's why they are not part of the present invention.

The invention claimed is:

1. A solution containing cyanamide, comprising:
   a) 15 to 60% by weight of cyanamide,
   b) 0.01 to 4% by weight of a stabilizer comprising one or more compounds from the group of phosphorus-containing acids or the salts thereof,
   c) a nonionic surfactant present up to 4% by weight wherein the nonionic surfactant further contains one or more compounds selected from the group of ethoxylates according to Formula (I), wherein for Formula (I) the following applies, $$R^1\text{—}O\text{—}(CH_2CH_2O)_n\text{—}H \qquad \text{Formula (I)}$$

wherein for the radical $R^1$ the following applies:
   $R^1$=a polyfunctional siloxane group according to Formula (V), wherein for Formula (V) the following applies

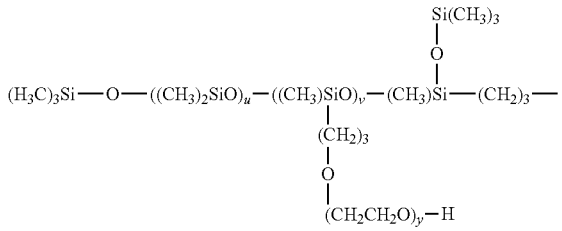

Formula (V)

wherein for the indices u, v and y, independently from each other, the following applies:
   u=a number from 0 to 3 and
   v=a number from 0 to 3,
   y=a number from 2 to 10,
n=a number from 2 to 10; and
   d) water as the remaining weight of the total solution,
   wherein the components a) and c) are present in a weight ratio of cyanamide to nonionic surfactant in the range from 500:1 to 5:1.

2. The solution containing cyanamide according to claim 1, wherein the solution containing cyanamide comprises 30 to 60% by weight cyanamide.

3. The solution containing cyanamide according to claim 2, wherein the solution containing cyanamide comprises 35 to 52% by weight cyanamide.

4. The solution containing cyanamide according to claim 1, wherein the one or more compounds from the group of phosphorus-containing acids or the salts thereof is selected from the group consisting of orthophosphoric acid, ammonium dihydrogen phosphate, diammonium hydrogen phosphate, sodium dihydrogen phosphate, disodium hydrogen phosphate, potassium dihydrogen phosphate, dipotassium hydrogen phosphate, and magnesium hydrogen phosphate.

5. The solution containing cyanamide according to claim 1, wherein the solution has a pH in the range from 3.5 to 5.5.

6. The solution containing cyanamide according to claim 5, wherein the solution has a pH in the range from 3.9 to 4.5.

7. The solution containing cyanamide according to claim 1, wherein the solution containing cyanamide further comprises up to 6% by weight of dicyandiamide.

8. The solution containing cyanamide according to claim 7, wherein the solution containing cyanamide further comprises up to 2% by weight of dicyandiamide.

9. The solution containing cyanamide according to claim 1, wherein the solution has a viscosity of less than 1 Pa s at 25° C.

10. The solution containing cyanamide according to claim 1, wherein the solution containing cyanamide further comprises up to 5% by weight of Formulation adjuvants.

11. The solution containing cyanamide according to claim 10, wherein the solution containing cyanamide further comprises up to 2% by weight of Formulation adjuvants.

12. A method for promoting or regulating plant growth, comprising applying to a plant the solution containing cyanamide according to claim 1.

13. A fertilizer or a plant growth regulator comprising the solution containing cyanamide according to claim 1.

* * * * *